219-121 SR
6/24/80 XR 4,208,774

United States Patent [19]

[11] 4,208,774
[45] Jun. 24, 1980

Voyer et al.

[54] PROCESS FOR WELDING FLANGES TO A CYLINDRICAL ENGINE CASING HAVING A PLURALITY OF SPACED RAILS AND RIBS

[75] Inventors: Peter E. Voyer, Tolland; Thomas C. Walsh, New Britain; Joseph Grzyb, Manchester, all of Conn.

[73] Assignee: United Technologies Corporation, Hartford, Conn.

[21] Appl. No.: 964,104

[22] Filed: Nov. 27, 1978

[51] Int. Cl.$^2$ .............. B23P 15/00
[52] U.S. Cl. .............. 29/156.4 R; 415/219 R; 219/121 EM
[58] Field of Search .............. 29/156.4 R, 411-416, 29/418; 138/159, 156, 157, 158; 415/219 R; 219/121 EB, 121 EM

[56] References Cited

U.S. PATENT DOCUMENTS

| | | | |
|---|---|---|---|
| 851,977 | 4/1907 | Bigsby et al. | 165/183 |
| 1,933,279 | 10/1933 | Quarnstrom | 138/156 |
| 2,256,221 | 9/1941 | Smith | 138/159 |
| 3,286,336 | 11/1966 | Lombardi | 29/411 |
| 3,905,085 | 9/1975 | Whiting et al. | 29/418 |
| 4,137,006 | 1/1979 | Becker | 29/156.4 R |

FOREIGN PATENT DOCUMENTS

| | | | |
|---|---|---|---|
| 1401318 | 4/1965 | France | 219/121 EB |

*Primary Examiner*—Daniel C. Crane
*Attorney, Agent, or Firm*—Norman Friedland

[57] ABSTRACT

The method disclosed herein is the improved construction of an engine split case by electron beam welding the mating flanges to the split case cylinder where the outer diameter of the case includes "L" shaped rails and radial circumferential flanges.

3 Claims, 2 Drawing Figures

FIG. 1
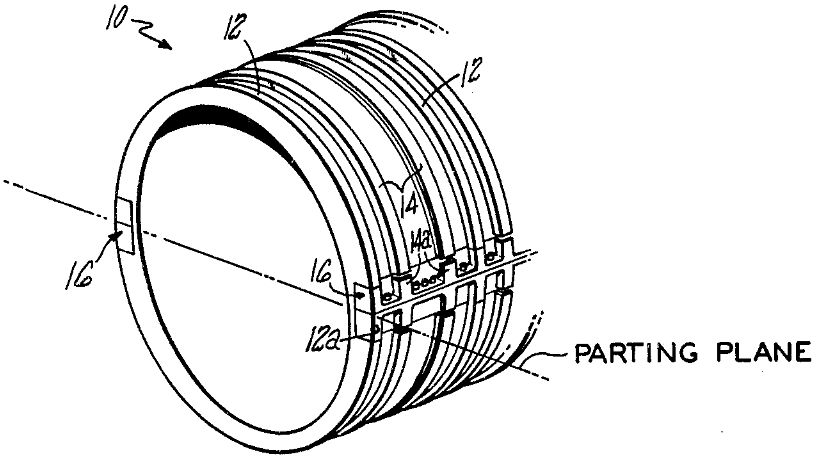
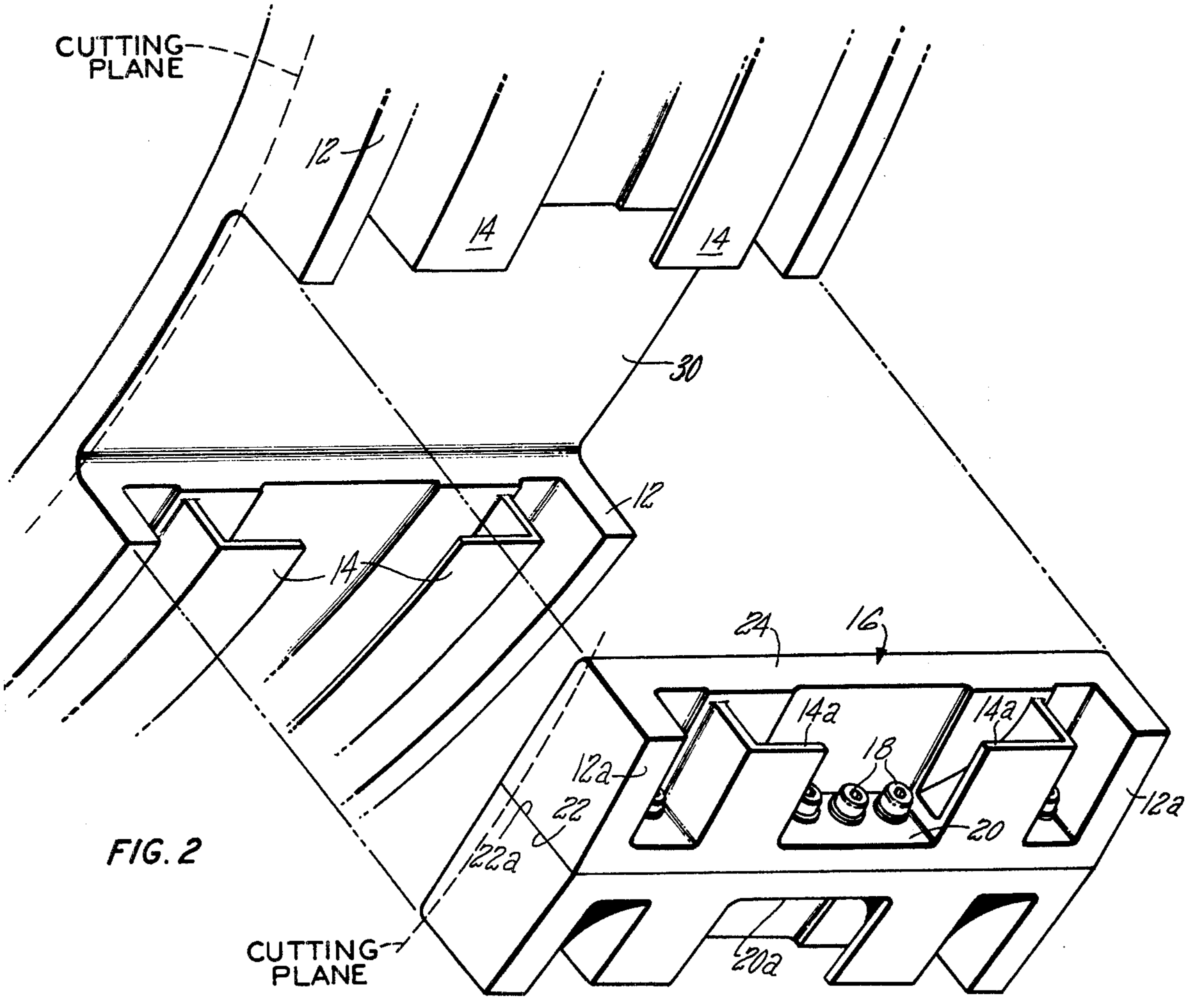
FIG. 2

PROCESS FOR WELDING FLANGES TO A CYLINDRICAL ENGINE CASING HAVING A PLURALITY OF SPACED RAILS AND RIBS

CROSS REFERENCE TO OTHER PATENT APPLICATIONS

This invention relates to the invention disclosed and claimed in an application filed by T. C. Walsh, P. E. Voyer and F. J. Wallace, entitled ENGINE SPLIT CASE CONSTRUCTION U.S. Ser. No. 964,103 filed on even date and assigned to the same assignee.

BACKGROUND OF THE INVENTION

This invention relates to gas turbine engines and particularly to the method of electron beam welding certain components to the split case construction.

The above cross-referenced patent application disclosed a method of fabricating a split case for a turbine type power plant. As noted therein the metal plate is rolled into a cylinder blank and butt welded, then grooved axially to accomodate a pair of mating flat plates that extend radially from the outer diameter, these plates are drilled to receive bolts and by turning the inner diameter of the cylinder to expose the inner edges of the flat plates the case becomes split and the flat plates serve as flanges to accommodate bolts that hold the two halves into place.

In certain engine models it is desirable to incorporate rails that extend radially and circumferentially around the outer diameter of the case. Additionally radial structural circumferential ribs are formed on the outer diameter of the case. Inasmuch as it is necessary to weld the flanges into place and because of the material selected, say titanium or an alloy thereof, electron beam welding has become essential to the construction thereof. The flanges and rails however present welding problems that are solved by the present invention.

According to this invention we have constructed a split case by electron beam welding the mating flanges to the case and each half of the flange is constructed with a base, extending rib and rail that allow for constant metal exposure to the electron beam as it travels along the welding surfaces. The "L" shaped rails adjacent the flange are cut away to allow exposure to the welding surface and to avoid having the electron beam penetrating the vertical leg of the "L". The slot or groove is undercut so that the flanges extending into the groove sets below the cutting surface. In this manner the inner diameter and the inner edge of the flange are turned concomitantly to assure an integral and uniform internal surface of the cylinder.

SUMMARY OF THE INVENTION

A feature of this invention is the improved construction of a split case for a turbine type power plant that is characterized as being easy to fabricate and less costly than the heretofore known method. A feature of this invention is the discrete shape of the mating flanges allowing for constant and uniform contact of the electron beam welding the surfaces between the cylinder and flange halves. When "L" shaped rails are included on the cylinder, they are sufficiently cut back away from the flange to allow the unimpeded travel of the beam as it translates along the welding surface.

Other features and advantages will be apparent from the specification and claims and from the accompanying drawings which illustrate an embodiment of the invention.

BRIEF DESCRIPTION OF DRAWINGS

FIG. 1 is a partial view in perspective showing the split case of a gas turbine engine prior to the step of splitting the case;

FIG. 2 is an exploded view in perspective illustrating the details of the flange/cylinder of FIG. 1.

DESCRIPTION OF THE PREFERRED EMBODIMENT

For the sake of simplicity and convenience, only that much of the manufacturing steps of fabricating a split case for a turbine type of power plant is shown that is necessary to describe the details of this invention. As shown in FIGS. 1 and 2 the cylindrical case 10 is formed either by forging or bending flat plates of suitable metal such as titanium or alloy thereof and butt welding the edges (weldment not shown). The outer ribs 12 are formed for structural purposes and the "L" shaped rails 14 are machined on the outer diameter of cylinder 10. Corresponding ribs **12*a* and "L" shaped rails 14*a* are machined as the outer surface or top surface of flange 16. Flange 16 is formed into two complimentary halves and carry a plurality of matching holes for accepting bolt assemblies 18 serving to bolt the two halves together. Located on the inner edge or mating edges 20 and 20*a* are the rib or flange faces 22 and 22*a* which are discretely spaced from the weld interface 24. After securing the two halves of flange 16 it is inserted into the axial slot 30 formed in the cylinder 10. As noted from FIG. 1 the rails 14 adjacent the corresponding rails 14*a* are machined back slightly so as not to impede the flow of electrons in the process of electron beam welding the flange into the slot 30**.

Slot 30 is cut deeper into cylinder 10 than would otherwise be necessary so that the step of machining the inner diameter of the cylinder splits the case. The inner edge of flange 16 is also bored in this operation to assure alignment of the inner diameter of the cylinder. Obviously, by removing that amount of metal from the inner diameter of the cylinder 10, the case will split along the parting plane defined by the mating faces of both halves of each of the flanges.

The space formed by machining back the "L" shaped rails can be welded by say a tungsten inert gas welding technique.

While a two piece split case is described as the preferred embodiment it may be desirable to split the case into multiple pieces and such designs are contemplated within the scope of this invention.

It should be understood that the invention is not limited to the particular embodiments shown and described herein, but that various changes and modifications may be made without departing from the spirit or scope of this novel concept as defined by the following claims.

We claim:

1. The method of forming a casing for a gas turbine engine wherein the casing includes a cylinder having a plurality of circumferentially axially spaced radially extending ribs and "L" shaped rails, including the steps of:

cutting a pair of axial diametrically opposed slots extending the length of the cylinder on the outer diameter thereof, said cylinder being formed with a plurality of circumferentially axially spaced radially extending ribs and "L" shaped rails;

forming a pair of mating members each having an axially extending base portion and each having a mating face formed on one edge of a radially extending portion;

machining the outer surface of said mating member to form radially extending ribs and "L" shaped rails corresponding to the ribs and "L" shaped rails of the cylinder;

drilling a plurality of complementary axially spaced holes in the radially extending portion of said mating members and bolting each of said pair together;

inserting the bolted mating members into said slots formed in the step of cutting, with the ribs and "L" shaped rails of the cylinder in mating members being in aligment with one another, said "L"

shaped rails of the cylinder and the mating members being spaced from one another; and electron beam welding each of the mating members to the cylinder at the interface of the wall of the slot by applying the stream of electrons axially along the welding surface wherein the spacing allows unimpeded application of the beam between the "L" shaped rails as there is translation between the beam and welding surface.

2. The method as claimed in claim 1 including the step of machining back an edge portion of the "L" shaped rail at the location adjacent the welding surface to form said spacing between said "L" shaped rails of the cylinder and mating members.

3. The method as claimed in claim 2 wherein said cylinder is fabricated from titanium or an alloy thereof.

* * * * *